INVENTORS
GUSTAVE A. OVERSTROM,
GEORGE OVERSTROM,
CONRAD OVERSTROM,
BY Darby & Darby
ATTORNEYS.

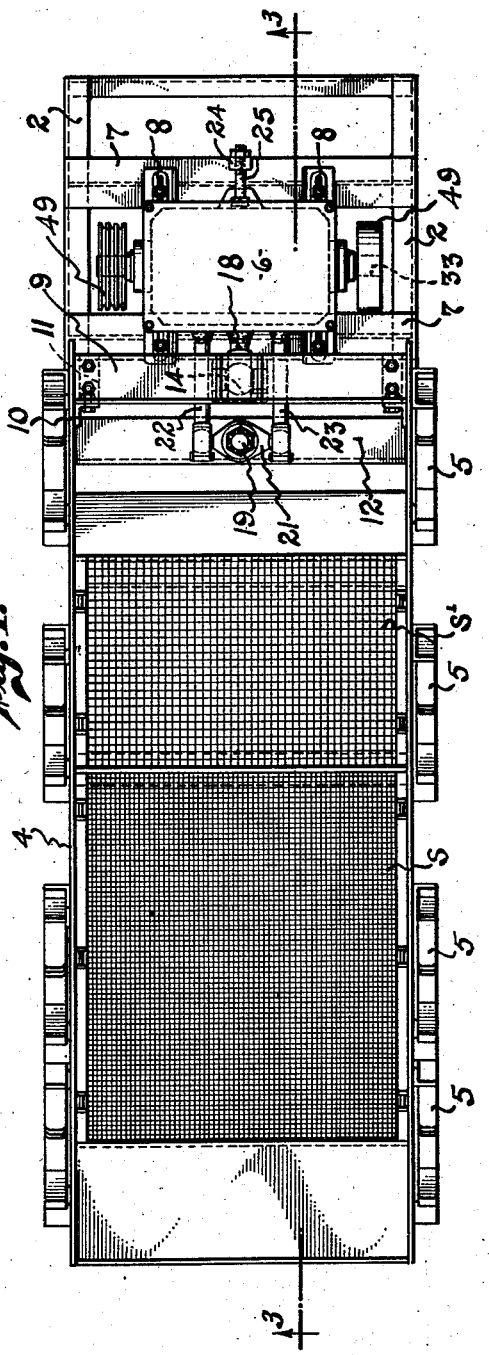

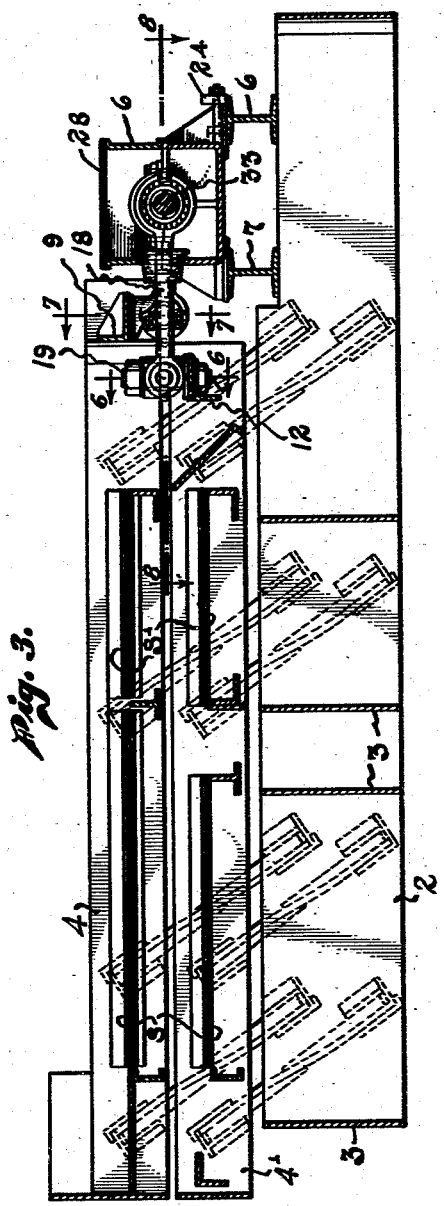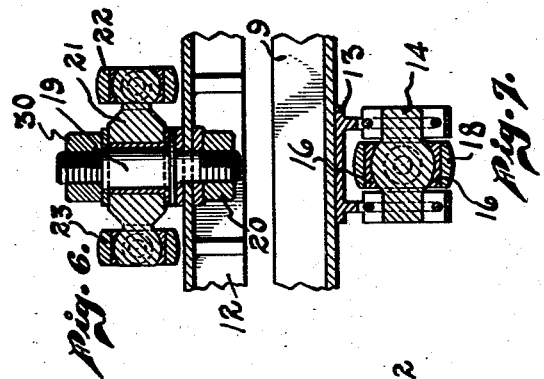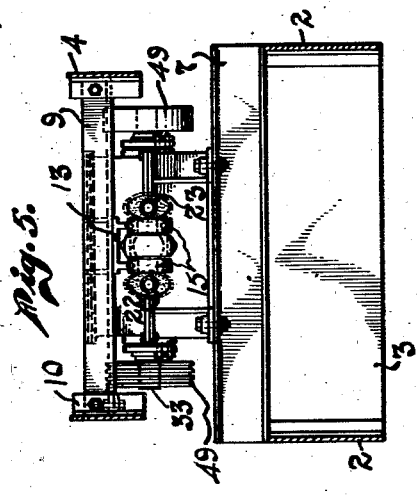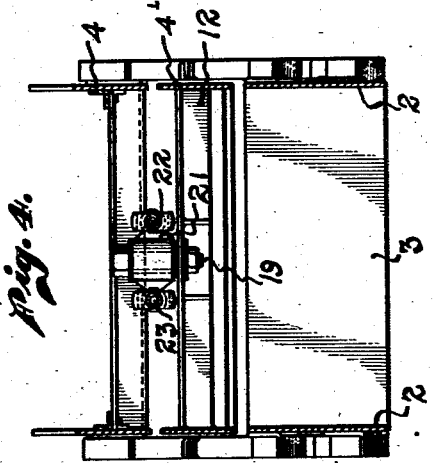

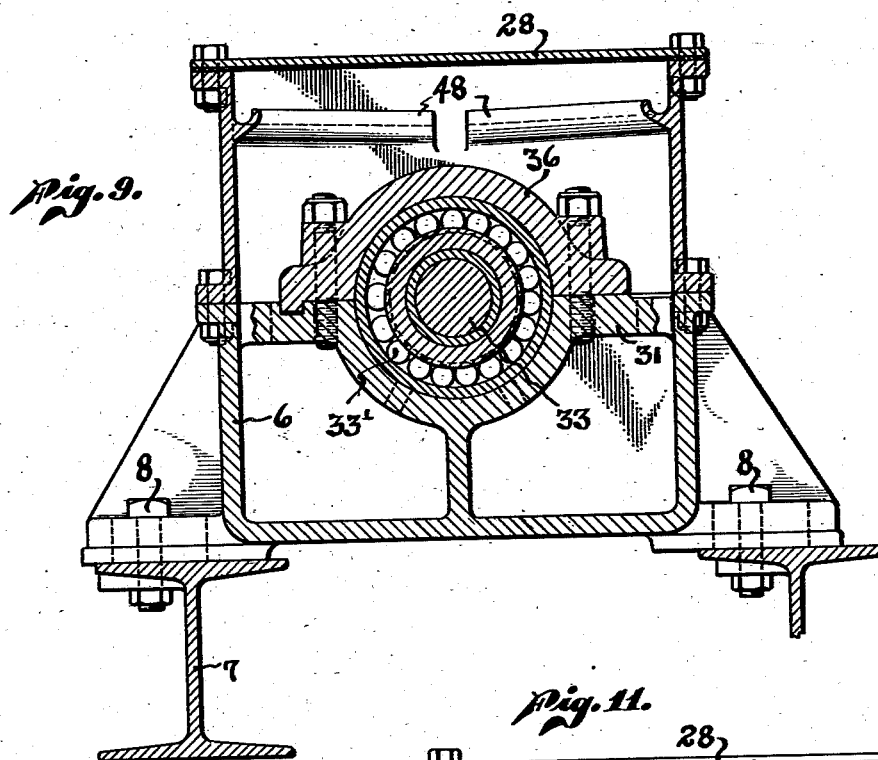
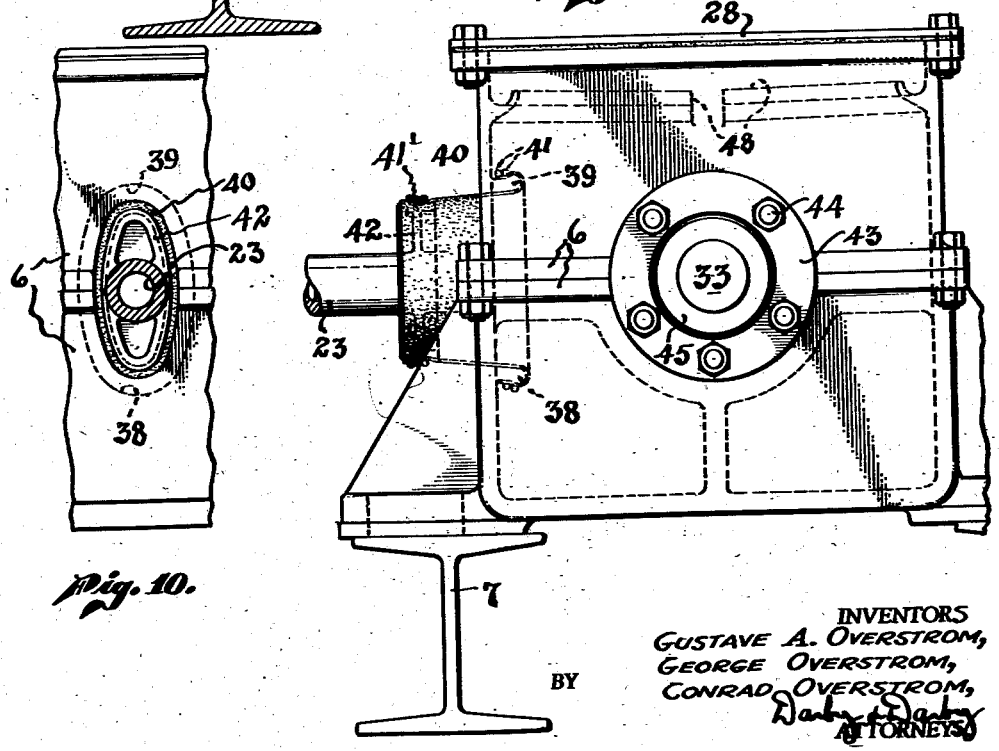

INVENTORS
GUSTAVE A. OVERSTROM,
GEORGE OVERSTROM,
BY CONRAD OVERSTROM,
ATTORNEYS

June 9, 1942.   G. A. OVERSTROM ET AL   2,285,678
VIBRATORY SCREEN STRUCTURE
Filed May 21, 1940   6 Sheets-Sheet 6
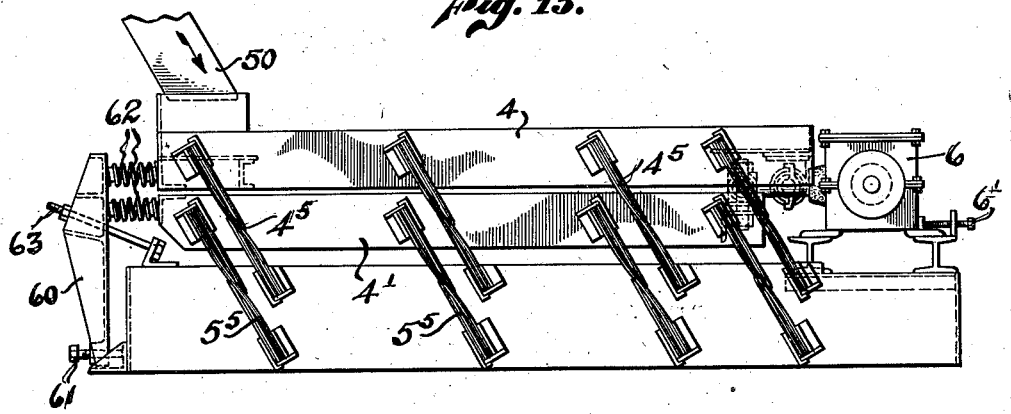
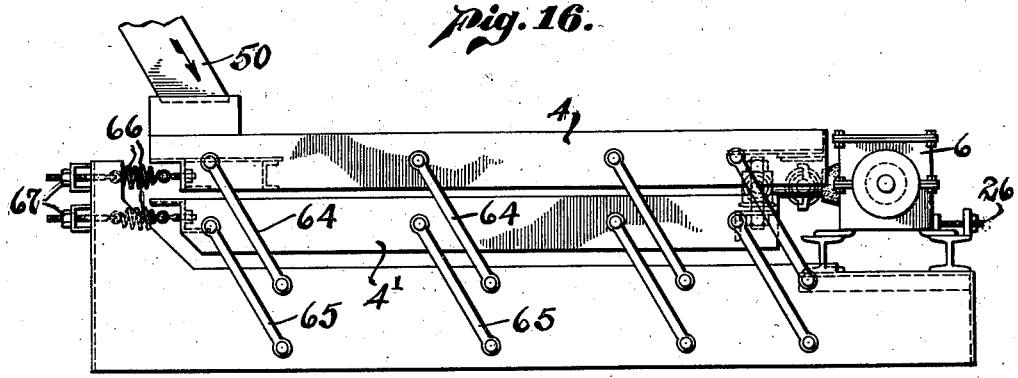
INVENTORS
GUSTAVE A. OVERSTROM,
GEORGE OVERSTROM,
BY CONRAD OVERSTROM,
ATTORNEYS

UNITED STATES PATENT OFFICE 2,285,678

VIBRATORY SCREEN STRUCTURE

Gustave A. Overstrom and George Overstrom, Eagle Rock, and Conrad Overstrom, Altadena, Calif.

Application May 21, 1940, Serial No. 336,347

13 Claims. (Cl. 209—315)

This invention relates to improvements in vibratory screen structures of the balanced type.

An object of the invention is to provide a vibratory screen structure of the balanced type in which the forces applied to the screen boxes or decks to vibrate them are applied thereto in the same longitudinal planes, both horizontally and vertically.

Another object of the invention is to provide, in a screen structure of this type, for the application of the driving forces to the screen boxes in a manner to equalize them through central points of universal joint application.

A further object of the invention is to provide a screen structure in which the driving forces for the screen boxes are applied through equal angles in a vertical plane to both screen boxes and particularly along parallel lines, that is to say, where the angles of application are zero, or approximately zero.

A still further object of this invention is to provide a screen structure of the balanced type in which one reciprocating screen balances the other and in which the means to operate the structure exerts its driving forces in substantially the same planes, both vertically and horizontally.

Another object of this invention is to provide a screen structure in which the vibrating screen boxes are independently in tension under equalized driving forces.

For another object of this invention we have provided in a multiple screen box vibratory screen structure positive driving connections applied to the respective screen boxes so that they are at all times in tension and in a modification in compression.

It is among other objects of the invention to provide a screen structure positive in its movements and in which there is no reversal of the stresses in the screen boxes, as a consequence of which there can be no stress reversals or lost motion in the driving mechanism.

A more general object of this invention is to provide a vibrating screen in which the screen box is supported on legs which are flexible, or the equivalent thereof, and which may or may not be inherently resilient in combination with means including driving mechanism for maintaining the box and driving mechanism in either tension or compression so that the flexible legs are stressed but in the operation of the device do not pass through neutral or unstressed position.

Other but more detailed objects of this invention will appear more fully hereinafter.

In the operation of screen structures of the balanced type, supported on legs and actuated by eccentric driving means, serious difficulties have been encountered in making the structure operate smoothly and in perfect balance. Difficulty has also been encountered in applying the eccentric drive to the screen decks so as to get balanced operation.

Generally, in prior art screen structures of the balanced type, using leg supports for the decks, the legs of the respective decks are substantially parallel. The drive mechanism is generally located at one end and in a line about midway between the decks. The connecting rods leading from the eccentric shaft to the decks form an oblique angle with the leg supports. This oblique pulling angle is not the same with reference to the legs supporting the top deck and those supporting the bottom deck. Generally one set of rods pulls down and one set pulls up. This produces an unbalanced condition which we propose to balance by applying the pulling force in the same horizontal plane for both decks.

We have found that the manner in which the pull is applied to the leg supported deck affects the efficiency of the apparatus. For example, if more resistance is offered to the pull on one side than on another, which may be due to unequal loading or inequality in workmanship, or both, serious knocks occur in the pin joints. If the pull is not even to both decks, and to both sides of each deck, knocking in the pin joints occurs, and material on the deck has a tendency to run to one side or the other of the deck in its travel along the same, and we remedy this defect by applying the pulling force in the same vertical plane for both decks.

There is an unavoidable side-swaying tendency to leg supported screens when in operation, often due to periodic unequal live loads on one side or the other, as well as to vibration shocks caused by other machinery in the building structure; and therefore the mechanism driving or vibrating the deck should be arranged to allow the deck to have its natural side sway. The connection between the eccentric drive mechanism and the screen decks of the prior art screens of the balanced leg supported type did not provide for this natural side sway, and as a result, serious mechanical faults, pounding, breakages and structural failures developed, and impaired screening efficiency resulted in those screens.

We overcome all these difficulties, noises, knocks and breakages in the mechanism and the screen box structures by providing a driving mechanism including an eccentric shaft located in substantially the same horizontal plane as the connections to both screen decks, and this is accomplished by means of a central ball and socket connection from the eccentric shaft to one of the screen boxes, and a central connection to the other screen box by means of two eccentrics connected to a centrally pivoted whippletree, so that the final pull is centralized in the same horizontal as well as in the same longitudinal vertical plane.

This construction not only perfectly balances the opposing forces in a vertical plane, i. e., the tossing forces, but also perfectly balances and centralizes the side weaving of the reciprocated structures in horizontal planes. All this is also accomplished while the operating mechanism parts, as well as the screen box structures, are maintained under constant freedom from destructive stress reversals, and all lost motion is eliminated.

We have found from practice that to successfully balance large size screens supported on leaf spring legs has presented a serious problem, particularly so when the frames of the screen deck were subject to alternate tension and compression. Stress reversals of this character will wreck a vibrating frame of the stoutest material, and likewise stress reversals will cause rapid wear of moving parts of the mechanism that vibrate the decks. To overcome this difficulty, we have found that the screen box must be subjected to a uniform stress. This stress may be either tension or compression, and must be continuous from end to end of the structure. In short and wide structures it is immaterial whether the stress be tension or compression; but in large size structures our preference is to subject the decks to a uniform tensional stress, because the frames then can be made lighter. However, as far as the actual operation of the screen goes, the uniform stress can be compression, provided the strength of the frames is increased enough to prevent buckling.

In order that no stress reversals or lost motion occur, of course, the uniform stress throughout the screen decks must be in the same general direction at all times regardless of the movement of the deck; that is, regardless of whether the deck moves forward or backward.

The one way stresses in the mechanism and in the screen boxes are maintained by the force in all the spring legs exerting their pressure throughout the whole length of the screen boxes to the driving mechanism. We usually prefer to place the feed end opposite the head motion end so that the discharge end of the screen is at the head motion end. This arrangement allows of lighter spring legs and screen boxes to be used, because the gravity of the screen box and its load helps the spring legs out in keeping the whole in tension. The motion then has to pull the screen box and its load up and forward, and gravity assisted by spring pressure pushes the screen box downward and backward towards the feed end. It can be readily understood, however, that the head motion can also be placed at the feed end.

In order to obtain fast enough tossing and screening action, the screen runs faster than gravity will carry it back, hence gravity alone is not enough for this purpose, but spring assistance is needed.

We prefer using spring legs of sufficient strength to give the required resistance to prevent stress reversals from occurring in the mechanism, but it is evident that auxiliary springs may be used in combination with the spring legs to create any required amount of stress in the frames.

We have found that better screening efficiency is obtained and less vibration transmitted to the structure when the movements of the decks in the structure are positive; that is, when the movements of the decks are not subject to a diminishing travel due to an overload. In some prior art leg supported screens of the so-called balanced type, the movement of the screening deck is subject to a diminished travel when an overload on that deck occurs, while the companion member that acts to balance the screening deck is subject to an increased travel. This condition of diminished travel of the screening deck and over-travel of the balancing deck or weight, in turn works to still further decrease the travel of the screening deck and increase the travel of the companion member. In our structure both decks are positive in their movements and not subjected to diminished travel due to an overload.

This invention resides substantially in the combination, construction, arrangement and relative location of parts, all in accordance with this disclosure.

Referring to the accompanying drawings, in which examples of our invention are illustrated, and where the same reference numerals have been used throughout to indicate the same parts:

Figure 1 is a top plan view of a double deck screen in accordance with this invention;

Figure 2 is a side elevational view of the same;

Figure 3 is a cross-sectional view taken on the line 3—3 of Figure 1;

Figure 4 is a cross-sectional view taken on the line 4—4 of Figure 2;

Figure 5 is a cross-sectional view taken on the line 5—5 of Figure 2;

Figure 6 is a cross-sectional view taken on the line 6—6 of Figure 3;

Figure 7 is a cross-sectional view taken on the line 7—7 of Figure 3;

Figure 9 is an enlarged cross-sectional view taken on the line 9—9 of Figure 8;

Figure 10 is a front elevational detail of the structure in Fig. 11;

Figure 11 is a side elevational view of the driving mechanism housing;

Figure 15 is a side elevational view of a modification employing flexible (but non-resilient within the meaning of this invention) supporting legs with means including the driving mechanism for placing the parts in compression;

Figure 16 is a similar view of a modification showing pivoted supporting legs and means in combination with the driving mechanism for placing the parts in tension.

Figure 8:
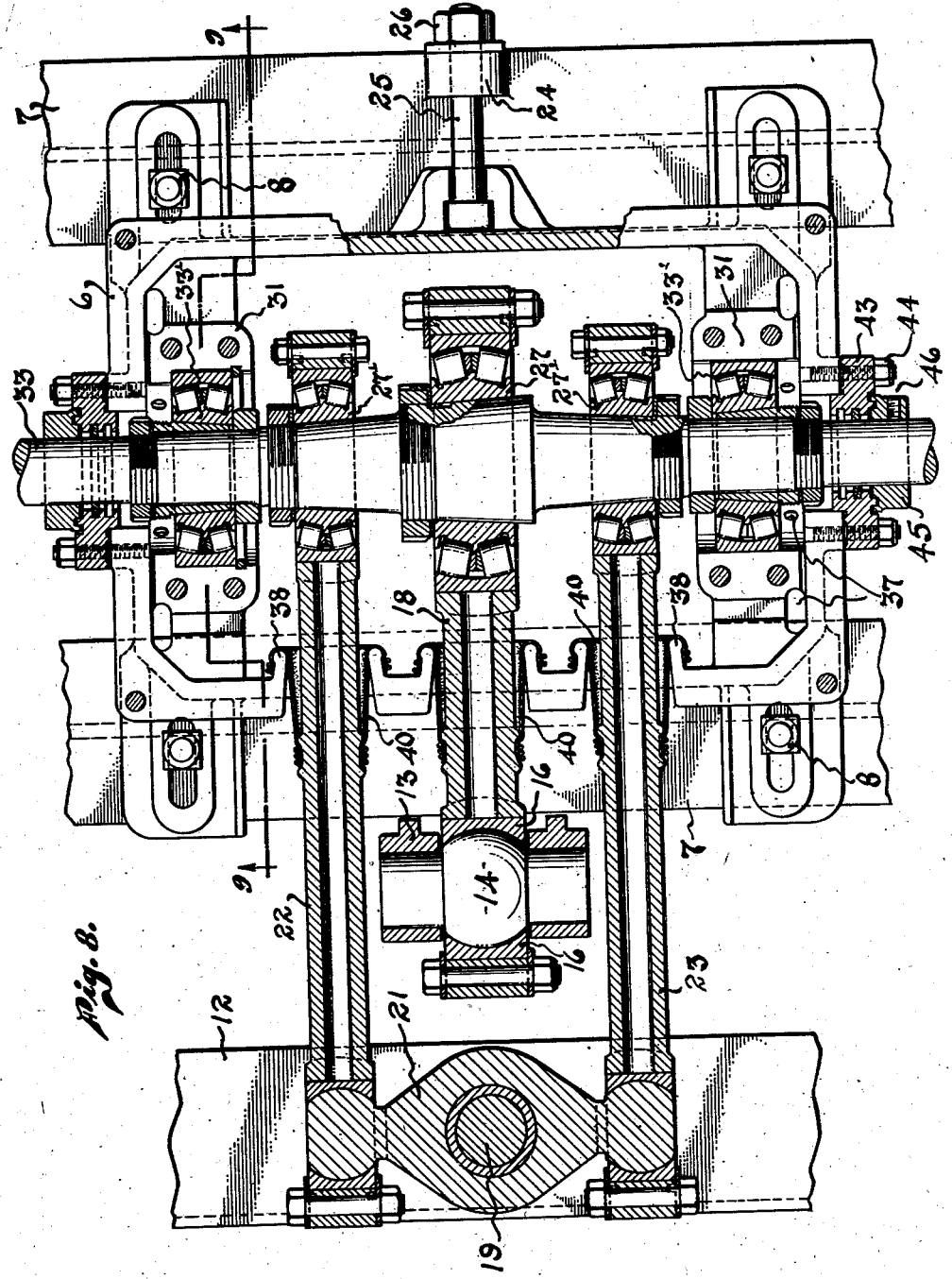
Figure 8 is a cross-sectional view taken on the line 8—8 of Figure 3.

At the outset it may be noted that the subject matter of the invention herein disclosed is related in some respects to the invention disclosed in our copending application Serial No. 336,346, filed May 21, 1940, now Patent No. 2,279,742, issued April 14, 1942.

The structure of the apparatus herein disclosed will now be described in detail, with due reference to the accompanying drawings.

As illustrated in Figure 2, the apparatus is provided with a base 1 which is illustrated in the form of an open framework comprising side stringers 2 and end and cross-bracing members 3 holding them in parallel relation and united thereto in any suitable manner to form a rigid base.

The screen boxes or decks, of which two are shown in the embodiment illustrated, are indicated by the reference numerals 4 and 4' and are disposed one over the other. These screen boxes are not shown in much detail in view of the fact that they are known in many forms and the details thereof are of no significance with respect to the present invention except in so far as they are hereinafter referred to.

In accordance with usual practice, there is secured in each screen box a perforated member, such as a woven screen or mesh of metal, fabric or other suitable material. As illustrated in Figure 1, the screen for the upper box 4 is shown as comprising two parts S and S' of different size mesh. This feature is, however, of no importance to the present invention.

The screen boxes 4 and 4' are separated from the base by means of spring legs 5 and 5' respectively, each of which is rigidly attached at its lower end to the base and at its upper end to the associated screen box. These connections are all rigid connections so that movements of the box effect transverse flexing of the spring legs which are transversely flexible. Further reference to the spring legs will occur hereinafter.

It is noted that flexible spring supports of the type herein disclosed are known in the art, as well as their manner of attachment, as illustrated for example in United States Letters Patent No. 2,062,760, granted December 1, 1936, to Gustave A. Overstrom, one of the applicants herein.

Mounted on the base 1, on a pair of I-beams 7 secured to the base and providing further cross-bracing therefor, is a driving mechanism housing 6. As clearly illustrated in Figs. 9 and 11, this housing consists of two portions suitably secured together and is provided with a removable cover 28. Referring to Figs. 2 and 8, it will be seen that the housing 6 is provided with feet having slots therein through which the tightening bolts 8 pass, as well as through the I-beams 7.

As is clearly seen in Fig. 8, the housing 6 is provided with a square headed bolt 25 mounted in a socket on the housing 6. The bolt 25 passes through an arm 24 rigidly attached to the adjacent I-beam 7 and a nut engages threads on the bolt so that the entire mechanism housing may be adjusted longitudinally of the base to provide a simple means for tensioning the apparatus including the driving connections, as will appear later. When adjusted the housing may be locked to the I-beams 7 by means of the nuts and bolts 8.

As seen in Figs. 1 and 2, the ends of the decks 4 and 4' adjacent the housing 6 are provided with angle bars 9 and 12. The angle bar 9 is secured to the box 4 by means of brackets 10 and 11 and nuts and bolts which unite these parts together. The angle iron 12 is attached to the box 4' in any suitable manner, as by welding where the sides of the box are of metal.

As will be seen from Fig. 5, there is secured to the lower face of the angle iron 9 a bracket 13 (see also Fig. 7) in which is secured a pin 14 having a ball-shaped central portion. This pin is held in the bracket, in suitable bearings, by means of the bearing caps 15. As shown in Figs. 3 and 6 there is mounted on the angle bar 12 a stud 19 which is secured to the bar by means of a nut 20. Pivotally mounted on the stud is a lever 21 which may be termed a whippletree, which is provided at its ends with ball-shaped terminals. The double lever 21 is held on the stud 19 for pivotal movement without binding by means of a nut 30 which engages a shoulder on the stud 19, as is clear from Fig. 6.

Referring again to Fig. 8, there is shown within the housing 6 a shaft 33 which is journalled in concentric bearings 33' mounted in brackets 31 at the sides of the housing. An oil and dirt seal of the labyrinth type is provided for the shaft 33, as illustrated at 43, which structure is held to the casing by the bolts 44. A labyrinth sealing collar 45 is provided at each end and each is secured in place by a set screw 46. The housing is adapted to be partially filled with oil and the oil drain openings 37 are provided around these bearings so that excess oil can be drained from them. As will appear later, these bearings are oiled by splash action.

The bearing housings, as will be seen from Fig. 9, include removable caps 36. The shaft 33 can easily be removed because its longitudinal center is at the joint of the parts of the casing 6. Gutters 48 are formed on all of the inner faces of the housing 6 and are arranged so that oil splashed into them will drain back onto the bearings.

The shaft 33 is provided with three eccentrics, each eccentric having the same amount of throw. The largest eccentric 27 is mounted at the middle of the shaft while on the opposite sides thereof are the smaller eccentrics 27' which are displaced 180 degrees with respect to the central eccentric. Journaled on the eccentric 27 by means of suitable roller or ball bearings is a connecting rod 18 which engages the bearing members 16 which form a universal seat for the ball portion of the pin 14 which, as previously described, is mounted in the bracket 13. The smaller eccentrics 27' are likewise provided with connecting rods suitably journaled thereon, as shown at 22 and 23 respectively. The central portion of all connecting rods is preferably hollow to lighten them.

The other ends of the connecting rods 22 and 23 are connected to the ball terminals of the double lever 21 by means of seats like seats 16 to form universal joint seats. The three connecting rods pass through openings in the front wall of the casing 6 which are centrally disposed with respect to the line of separation of the casing parts (see Figs. 10 and 11).

The lower part of the casing, at each opening, is provided with a rim 38 and the upper part with a rim 39 which rims mate in pairs to form ring-like seats for the ends of the flexible boots 40 through which the connecting rods pass. The adjacent ends of the boots 40 are attached by means of rings or wires 41. Secured to the respective connecting rods (see Fig. 10) are the spiders 42 lying within the other ends of the boots and secured thereto as indicated at 41'. These boots, of course, form effective seals against leakage of oil and entry of dirt, while permitting relative movement of the connecting rods with respect to the housing 6. The ends of the shaft 33 which project outside the housing are provided with flywheels 49 (see Fig. 5) one of which is provided with V-grooves to permit of V-belt drive of the mechanism from any external power source.

From the description of the above structure it will be seen that the connections between the drive shaft 33 and the screen boxes are positive connections which lie parallel to each other. The connections to the screen boxes are of the universal joint type which permit of relative movement and particularly side sway of the screen boxes with respect to the connecting rods without overstraining them. The actual points of connection to the screen boxes are in the same vertical plane. By reference to Fig. 3 it will also be seen that the centers of these connections are in the same horizontal plane. Thus the driving forces are applied to the screen boxes along substantially the same line as distinguished from prior arrangements where the lines of application of the forces lie at an angle.

In order that there be no reversal of stresses, either in the screen boxes or in the driving mechanism, in accordance with an important object of this invention, the spring legs 5 and 5' support the screen boxes 4 and 4' respectively in a manner so that the apparatus is either in tension or in compression at all times.

At this point it may be emphasized that in the form of device illustrated in the figures thus far described the supporting legs are not only flexible but are resilient in the sense that they are sufficiently strong, being made for example of steel, so that in addition to supporting the screen boxes when loaded they will have sufficient resiliency to impart the desired screening action when stressed. The spring legs 5, 5' which support the screen boxes 4, 4' respectively are stressed in a manner in accordance with this invention so that the reciprocating structure is either in tension or compression at all times. The spring legs 5 and 5' are attached to the screen boxes in a normal and unstressed condition and are arranged in a tension structure so that under all stresses normally encountered in the operation of the device the leaves comprising part of the spring legs do not open up. Thus, for example, as shown in Fig. 2, the spring legs are stressed into a flat S form in such a way that for all operations of the device they never reach an unstressed position and then pass beyond it so that the short leaf spring portions would open up or move away from the central leaf. The structure thus far described is always, and must be, maintained in tension by reason of the combination illustrated in order that the leaf springs do not open up. It is apparent that the arrangement of Fig. 2 could not be used in compression because the spring legs would be stressed on the other side, so to speak of the neutral position and cause the spring legs to open up. The amount of tension placed in the structure can be adjusted by loosening the bolts 8 and turning nut 26 so as to move the casing 6 to the right carrying the screen boxes with it by reason of their connection thereto.

It is to be noted that either end of the structure may be the feed end. Material may be fed into the upper screen at the end opposite to the driving end or it may be fed in at the driving end, whereby the alternate ends become the discharge ends.

It is hardly necessary to note, in view of the disclosure in Fig. 8, that shaft 33 is mounted so as to have no more than the normal end play necessary to free operation.

In the operation of this apparatus, the shaft 33 is caused to revolve at the desired speed through the application of power to one of the pulleys 49. The eccentrics 27' being radially displaced, preferably 180° with respect to eccentric 27, cause the connecting rods 2 and 23 to move in opposite directions with respect to connecting rod 18 and hence cause the screen boxes to always be moving in opposite directions. The result is that the apparatus is in as near perfect running balance as it is possible to accomplish in structures of this type.

The driving forces are applied to the screen boxes longitudinally thereof along lines which are parallel and in the same horizontal plane through points of connection to the boxes which are in the same vertical plane. Thus the driving mechanism does not in any way contribute to any unbalanced application of forces to the screen box. The types of connections are such that the boxes are free to have side sway without any contribution thereto by the driving mechanism, and without any undue strain thereon. Indeed, the connections are such that the driving forces tend to iron out any side swaying of the structure which would result from unequal loading thereof or inherent unbalanced leg resistances, which result is insured by the whippletree connection to the upper deck and the ball and socket connection to the lower deck.

Figure 12:
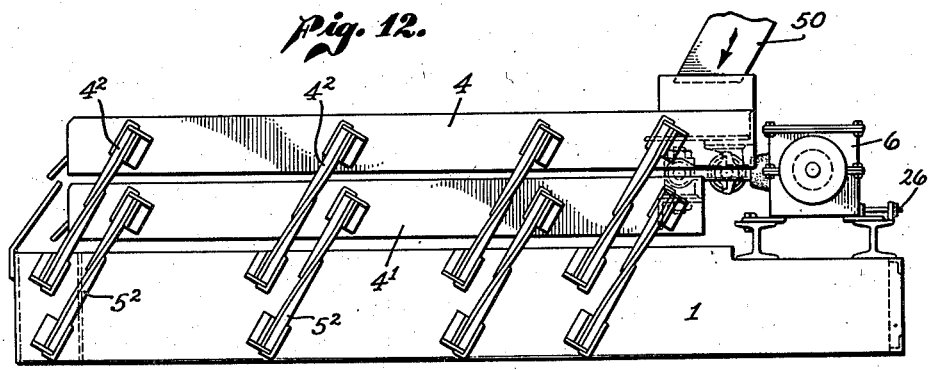
Figure 12 is a side elevational view of a modified arrangement showing the parts in tension.

Fig. 12 shows another arrangement similar to that previously described in which the parts are in tension. In this case, however, the spring legs $4^2$ and $5^2$ are inclined towards the right but have been reversed end for end so that they are stressed in a flat S in the opposite direction. Since they never go through a neutral position they likewise will not open up. The operation of this structure will be similar to that of the previous one.

Figure 13:
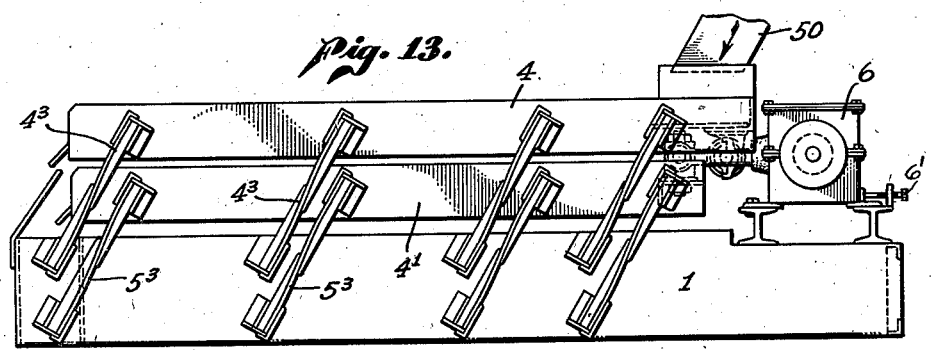
Figures 13 and 14 are side elevational views of further modifications showing the parts in compression.

The structure of Fig. 13 is similar to that of Fig. 12 but it will be noted that the spring legs $4^3$ and $5^3$ have been turned over so that the short backing spring leaves are on the opposite sides with respect to the arrangement of Fig. 12. The adjusting mechanism for moving the housing 6 differs from that previously described in that it is a simple bolt threaded in the bracket in which it is mounted and arranged to push the housing 6 to the left when the bolts 8 are loosened. In this case the spring legs are stressed against the form of a flat S but in such a manner that they do not open up. In the operation of this screen they remain stressed as shown so as not to ever pass through the neutral position. With this arrangement it will be seen upon consideration that all of the parts are in compression.

Figure 14:
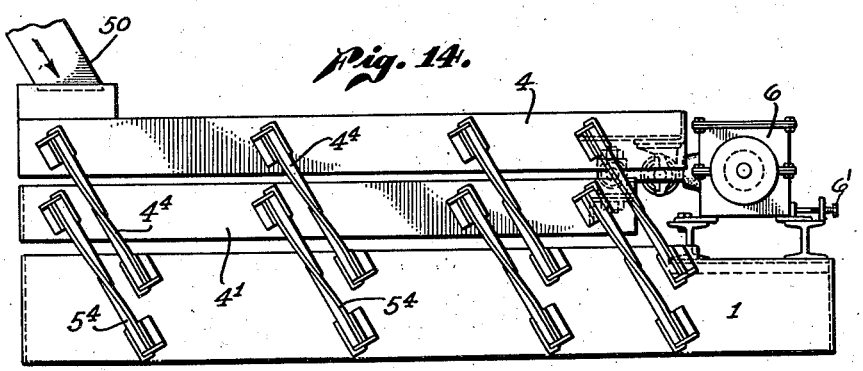

As noted at the outset of this disclosure, the objects and advantages of this invention may be employed with supporting legs which are flexible or the equivalent thereof without being resilient within the meaning of this disclosure. Thus in Fig. 15 an arrangement is employed in which the supporting legs $4^5$ and $5^5$ are made of wooden slats and stressed in a construction similar to that for the steel spring legs. Flexible supporting legs of wood of this type are disclosed in the above mentioned patent. In this case the spring legs serve to support the boxes but do not contribute to any extent in tossing the boxes. The structure of Fig. 13 is a compression structure and in view of the fact that the legs are not strong enough to provide the desired tossing action, compression springs 62 are employed. These compression springs are interposed between the left hand end of the boxes 4 and 4' and an abutment 60 in the form of a lever which is pivotally connected to the base by means of a bolt 63 or its equivalent. The lower end of the lever 60, and here it may be noted that several of these levers and sets of springs may be used if desired, is provided with an adjusting screw 61 which bears on the supporting base. In this case a threaded bolt 6' like the arrangement of Figs. 16 and 14 is employed to move the housing 6 to the left. Thus with this arrangement the entire structure may be put under compression against the resistance of springs 62. The flexible legs 4⁵ and 5⁵ are stressed into a flat S as before and never pass through the neutral position as previously explained. In order to keep the spring axes parallel to the planes of the screen boxes the bolt 61 may be adjusted as the structure is put under compression to accomplish this result. This structure acts similarly to those previously described but in this case the kicking forces are provided by the compression springs 62, the flexible legs serving merely to support the structure.

The objects of this invention may also be accomplished by pivoted supporting legs. Thus in Fig. 16 the screen boxes 4 and 4' are shown connected to the base by means of links 64 and 65 which have pivotal connection with the base and the boxes respectively. This arrangement is a tension structure and hence the tension adjusting device 26 similar to the arrangement of Fig. 2 is employed. Tension springs 66 connect the left hand ends of the boxes 4 and 4' with the base as shown and the tension thereon may be further adjusted by means of the nuts 67. With this arrangement the pivoted links serve to connect the spring boxes with the base while the springs 66 aid in placing the structure under tension and providing the necessary kick to the screen boxes to get the screening action desired.

The various structures herein disclosed are all functionally equivalent. It may be noted, since no reference has been made to the fact, that the drive mechanism in the housing 6 of the structures in Figs. 12 to 16 inclusive is the same as that disclosed in connection with the apparatus of Figs. 1 to 11 inclusive, as are the driving connections between the driving mechanism and the screen boxes.

We are, of course, aware that the principles of this invention may be embodied in other physical forms and we do not, therefore, desire to be strictly limited to the description as given for purposes of illustration, but rather to the scope of the claims granted us.

What is claimed is:

1. In a vibrating screen structure of the type described, a base, a pair of screen boxes arranged one above the other, transversely flexible spring legs interconnecting the boxes with the base, whereby the boxes are supported from the base, a drive shaft rotatably supported on the base having eccentrics positioned substantially 180° out of phase, pitmans cooperating with said eccentrics, and attaching means secured to the screen boxes at closely adjacent points, the points of connection of the pitmans to the attaching means lying in the same longitudinal vertical plane and in the same horizontal plane.

2. In a vibrating screen structure of the type described, a base, a pair of screen boxes positioned one above the other, transversely flexible spring legs interconnecting the boxes with the base, whereby the boxes are supported from the base, a drive shaft rotatably supported on the base having eccentrics positioned substantially 180° out of phase, connecting rods cooperating with said eccentrics, means for attaching the connecting rods to the screen decks respectively so that the operative points of connection thereto lie in the same horizontal plane and in the same longitudinal vertical plane, and means for adjusting the structure to place the driving connections and screen boxes in compression.

3. In a vibrating screen structure of the type described, a base, a pair of screen boxes positioned one above the other, transversely flexible spring legs interconnecting the boxes with the base whereby the boxes are supported from the base, a drive shaft rotatably supported on the base having eccentrics positioned substantially 180° out of phase, connecting rods cooperating with said eccentrics, means for attaching the connecting rods to the screen decks respectively so that the points of connection thereto lie in the same horizontal plane and one ahead of the other in the same longitudinal vertical plane, and means for adjusting the mechanism to place the driving connections and screen boxes in tension.

4. In a vibrating screen structure of the type described, a base, a pair of screen boxes arranged one over the other, transversely flexible spring legs interconnecting the boxes with the base whereby the boxes are supported from the base, a drive shaft rotatably supported on the base having eccentrics positioned substantially 180° out of phase, connecting rods cooperating with said eccentrics, means for attaching the connecting rods to the screen decks respectively so that the points of connection thereto lie in the same horizontal plane and in the same longitudinal vertical plane adjacent each other, and means for adjusting the mechanism to place the driving connections and screen boxes in compression.

5. In a vibrating screen structure of the type described, a base, a pair of screen boxes, transversely flexible spring legs interconnecting the boxes supported one above the other with the base whereby the boxes are supported from the base, a drive shaft rotatably supported on the base having eccentrics positioned substantially 180° out of phase, connecting rods cooperating with said eccentrics, means for attaching the connecting rods to the screen decks respectively so that the points of connection thereto lie closely adjacent in the same horizontal plane and in the same central vertical plane, the connecting means for one box comprising a ball and socket arrangement and the connecting means for the other box comprising a whippletree, and means for adjusting the mechanism to place the driving connections and screen boxes in tension.

6. In a vibrating screen structure of the type described, a base, a pair of screen boxes supported one above the other, transversely flexible spring legs interconnecting the boxes with the base whereby the boxes are supported from the base, a drive shaft rotatably supported on the base having eccentrics positioned substantially 180° out of phase, connecting rods cooperating with said eccentrics, means for attaching the connecting rods to the screen decks respectively so that the points of connection thereto lie close together in the same horizontal plane and in the same longitudinal vertical plane, the connecting means for one box comprising a ball and socket arrangement and the connecting means for the other box comprising a whipple tree, and means for adjusting the mechanism to place the driving connections and screen boxes in compression.

7. In a vibrating screen structure as described, a base, a pair of screen boxes positioned one over the other, transversely flexible spring legs each secured at one end to the base and each of one group secured at the other end to one of said boxes and each of the other group to the other of said boxes, a housing mounted on said base, driving means in said housing, and means for respectively connecting the screen boxes to said driving means so that the driving forces are applied through operative connections to the screen boxes at points which lie in a common vertical central plane and a common horizontal plane.

8. In a vibrating screen structure as described, a base, a pair of screen boxes positioned one over the other, transversely flexible spring legs each secured at one end to the base and each of one group secured at the other end to one of said boxes and each of the other group to the other of said boxes, a housing mounted on said base, driving means in said housing, and universal joint connecting means between the respective screen boxes and the driving means connected to the screen boxes so that the points of connection lie in the same vertical central plane of the screen boxes.

9. In a balanced vibrating screen structure as described, a base, a pair of screen boxes positioned one over the other, transversely flexible spring legs each secured at one end to the base and each of one group secured at the other end to one of said boxes and each of the other group to the other of said boxes, a housing mounted on said base, driving means in said housing, driving connections between the screen boxes respectively and said driving means, the driving connections being attached to the screen boxes at points which lie in a common horizontal plane and a common plane at right angles thereto including the longitudinal central axes of the screen boxes, and means for placing the screen boxes and driving mechanism in tension.

10. In a vibratory screen structure of the type described, a base, a pair of screen boxes positioned one over the other, transversely flexible legs connected to the base and screen boxes respectively to support the screen boxes from the base, a drive shaft journaled on the base having a central eccentric and a pair of eccentrics disposed at opposite sides thereof, a double ended lever pivotally mounted on a vertical axis on one of said screen boxes, a pair of connecting links connecting the ends of said lever with said pair of eccentrics, and another link connected to the central eccentric and pivotally connected on a horizontal axis to said other screen box.

11. In a vibratory screen structure of the type described, a base, a pair of screen boxes positioned one over the other, transversely flexible legs connected to the base and screen boxes respectively to support the screen boxes from the base, a drive shaft journaled on the base having a central eccentric and a pair of eccentrics disposed at opposite sides thereof, a double ended lever pivotally mounted on a vertical axis on one of said screen boxes, a pair of connecting links connecting the ends of said lever with said pair of eccentrics, and another link connected to the central eccentric and pivotally connected on a horizontal axis to said other screen box, said links being connected to said boxes with universal joints.

12. In a positive drive balanced vibratory screen structure the combination including a base, a pair of screen boxes disposed one above the other, means for yieldingly supporting said boxes on said base, means for vibrating said boxes mounted on said base, and universal joint connecting linkage between the vibrating means and each of the screen boxes arranged so that the connections are attached to the screen boxes in a common horizontal plane and a plane at right angles thereto and including the longitudinal central axes of the screen boxes.

13. In a positive drive balanced vibratory screen structure the combination including a base, a pair of screen boxes disposed one over the other, a plurality of resilient supports for maintaining said boxes on said base, vibration producing means mounted on said base, and universal joint connections between said means and said screen boxes, said means operating to impart opposite movements to said screen boxes through points of application that lie in the same horizontal plane and the vertical plane including the longitudinal central axes of the screen boxes against substantially uniform resistance of said resilient supports.

GUSTAVE A. OVERSTROM.
GEORGE OVERSTROM.
CONRAD OVERSTROM.

CERTIFICATE OF CORRECTION.

Patent No. 2,285,678.  June 9, 1942.

GUSTAVE A. OVERSTROM, ET AL.

It is hereby certified that error appears in the printed specification of the above numbered patent requiring correction as follows: Page 2, second column, line 11, for "diminishing" read --diminished--; page 4, second column, line 5, for "rods 2" read --rods 22--; page 5, second column, line 44, claim 5, strike out "supported one above the other" and insert the same after "boxes" and before the comma in line 42, same claim; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.